(12) United States Patent
Fukuhara et al.

(10) Patent No.: US 6,835,790 B2
(45) Date of Patent: Dec. 28, 2004

(54) (METH) ACRYLIC COPOLYMER AND ITS PRODUCTION PROCESS

(75) Inventors: Koji Fukuhara, Osaka (JP); Masato Nakano, Takatsuki (JP); Takashi Fujisawa, Toride (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/731,788

(22) Filed: Dec. 8, 2003

(65) Prior Publication Data

US 2004/0127660 A1 Jul. 1, 2004

(30) Foreign Application Priority Data

Dec. 25, 2002 (JP) .......................................... 2002-374417

(51) Int. Cl.[7] .............................................. C08F 216/12
(52) U.S. Cl. ....................... 526/333; 526/274; 526/278; 526/287; 526/328.5; 526/317.1
(58) Field of Search ................................ 526/333, 274, 526/278, 287, 328.5, 317.1

(56) References Cited

U.S. PATENT DOCUMENTS

| | | | |
|---|---|---|---|
| 4,500,693 A | | 2/1985 | Takehara et al. |
| 6,262,227 B1 | * | 7/2001 | Goto et al. ............. 528/502 R |
| 6,310,156 B1 | | 10/2001 | Maeda et al. |
| 6,447,696 B1 | * | 9/2002 | Takagi et al. ................ 252/180 |
| 6,451,952 B2 | * | 9/2002 | Yamaguchi et al. ......... 526/333 |
| 6,756,460 B2 | * | 6/2004 | Saeki et al. ............... 526/317.1 |
| 6,777,385 B2 | * | 8/2004 | Hemmi et al. ............... 510/477 |

FOREIGN PATENT DOCUMENTS

| JP | 61-293599 A | 12/1986 |
|---|---|---|
| JP | 62-214186 A | 9/1987 |
| JP | 3-163191 A | 7/1991 |
| JP | 6-263803 A | 9/1994 |
| JP | 11-315115 A | 11/1999 |

* cited by examiner

*Primary Examiner*—Tatyana Zalukaeva

(57) ABSTRACT

There are disclosed a (meth)acrylic copolymer and its production process, wherein the (meth)acrylic copolymer has the good chelating ability and dispersibility and is excellent both in the calcium-ion-binding ability and the gelation resistance in combination, and further, the deterioration of these various performances is inhibited even in the water system of high salt concentration. The (meth)acrylic copolymer comprises a constitutional unit (a) derivative from a specific (meth)acrylic monomer (A) and a constitutional unit (b1) derivative from a specific (meth)allyl-etheric monomer (B1) and has a phosphorus atom in the main chain; with the (meth)acrylic copolymer being characterized by having: a mutual ratio between the constitutional unit (a) and the constitutional unit (b1) in the specific range; a low molecular weight; and a content of phosphorus, as bonded to the copolymer, in the predetermined range; and further a gelation resistance of not more than 0.02 and a calcium-ion-binding ability of not less than 150 mgCaCO$_3$/g.

4 Claims, 2 Drawing Sheets

(METH) ACRYLIC COPOLYMER AND ITS PRODUCTION PROCESS

BACKGROUND OF THE INVENTION

A. Technical Field

The present invention relates to a (meth)acrylic copolymer and its production process, wherein the (meth)acrylic copolymer is, for example, used favorably for such as water-treating agents, scale inhibitors, anticorrosives, additives for excavation, soil-treating agents, dispersants, and detergent builders.

B. Background Art

Of water-soluble polymers such as (meth)acrylic (co) polymers, low-molecular-weight ones have hitherto been used favorably for such as dispersants (such as for inorganic pigments and metal ions), scale inhibitors, anticorrosives, or detergent builders by utilizing the excellent chelating ability and dispersibility of the low-molecular-weight water-soluble polymers.

There have hitherto been reported some arts to enhance the dispersibility, the scale inhibitability, and the anticorrosive ability by introducing phosphorus atoms into structures of the (meth)acrylic (co)polymers as follows.

There is reported a heat-resistant scale inhibitor including a (meth)acrylic polymer obtained by polymerizing (meth) acrylic acid in the presence of hypophosphorous acid (e.g. refer to JP-A-293599/1986).

There is reported an anticorrosive including a (meth) acrylic copolymer as an essential component wherein the (meth)acrylic copolymer is obtained by polymerizing a monomer mixture in the presence of hypophosphorous acid (salt) wherein the monomer mixture includes an unsaturated carboxylic monomer (e.g. (meth)acrylic acid) and a sulfonic-acid-group-and/or-hydroxy-group-containing unsaturated monomer (e.g. refer to JP-A-214186/1987).

There is reported a process for producing an anticorrosive for metals by polymerizing an unsaturated carboxylic monomer (e.g. (meth)acrylic acid) while gradually introducing hypophosphorous acid (salt) (e.g. refer to JP-A-163191/1991).

There is reported a process for producing a (meth)acrylic water-soluble polymer by carrying out polymerization while gradually introducing a (meth)acrylic water-soluble monomer, a polymerization initiator, and hypophosphorous acid (salt) into an aqueous medium, wherein the (meth) acrylic water-soluble polymer to be produced is excellent in the inorganic-pigment dispersibility, the scale inhibitability, and the anticorrosive ability (e.g. refer to JP-A-263803/1994).

Because the phosphorus-containing (meth)acrylic (co) polymers which have hitherto been reported as mentioned above are excellent in the dispersibility, the scale inhibitability, and the anticorrosive ability, they could be applied favorably to dispersants, scale inhibitors, and anticorrosives.

However, these prior phosphorus-containing (meth) acrylic (co)polymers have problems of: not sufficiently displaying the calcium-ion-binding ability which is one of important builder performances; and therefore being unusable as high-performance detergent builders.

In addition, (co)polymers to be used for such as dispersants, scale inhibitors, anticorrosives, and detergent builders are required to have a property of little gelling (gelation resistance). However, the prior phosphorus-containing (meth)acrylic (co)polymers are poor in the gelation resistance. For example, in the water system of high hardness in which the ion concentration in water is very high (e.g. in seawater), the prior phosphorus-containing (meth) acrylic (co)polymers are put under circumstances where they extremely easily gel.

SUMMARY OF THE INVENTION

A. Object of the Invention

Accordingly, an object of the present invention is to provide a (meth)acrylic copolymer and its production process, wherein the (meth)acrylic copolymer has the good chelating ability and dispersibility and is excellent both in the calcium-ion-binding ability and the gelation resistance in combination, and further, the deterioration of these various performances is inhibited even in the water system of high salt concentration.

B. Disclosure of the Invention

The present inventors diligently studied to solve the above problems. As a result, they have completed the present invention by finding out that all the above problems can be solved only in the case where, in a low-molecular-weight (meth)acrylic copolymer which comprises a constitutional unit derivative from a (meth)acrylic monomer and a constitutional unit derivative from a (meth)allyl-etheric monomer of a specific structure and has a phosphorus atom in the main chain, there exist the constitutional unit derivative from the (meth)acrylic monomer and the constitutional unit derivative from the (meth)allyl-etheric monomer of the specific structure in a specific ratio, and the phosphorus compound content is not higher than a predetermined ratio wherein the phosphorus compound is not bonded to the copolymer.

That is to say, a (meth)acrylic copolymer, according to the present invention, comprises a constitutional unit (a) derivative from a (meth)acrylic monomer (A) of a general formula (1) below and a constitutional unit (b1) derivative from a (meth)allyl-etheric monomer (B1) of a general formula (2) below and has a phosphorus atom in the main chain;

with the (meth)acrylic copolymer being characterized by having:

a mutual ratio between the constitutional unit (a) and the constitutional unit (b1) in the range of the constitutional unit (a) 80 to 96 mol % and the constitutional unit (b1) 4 to 20 mol %; and a weight-average molecular weight in the range of 500 to 4,000; and a weight P1 of phosphorus atoms as bonded to the copolymer and a weight P2 of phosphorus atoms as not bonded to the copolymer satisfy a relationship of $0.9 \leq P1/(P1+P2) \leq 1.0$; and further a gelation resistance of not more than 0.02 and a calcium-ion-binding ability of not less than 150 $mgCaCO_3/g$;

wherein the general formula (1) is:

(wherein: $R^1$ denotes a hydrogen atom or a methyl group; and X denotes a hydrogen atom, a metal atom, an ammonium group, or an organic amine group); and wherein the general formula (2) is:

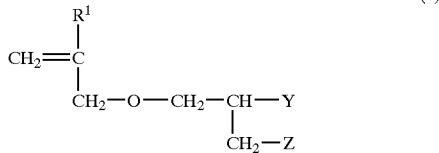

(2)

(wherein: $R^2$ denotes a hydrogen atom or a methyl group; and each of Y and Z independently denotes a hydroxyl group or a sulfonic acid group (wherein the sulfonic acid group may be in the form of a monovalent metal salt, a divalent metal salt, an ammonium salt, or a salt of an organic amine group) wherein at least one of Y and Z is the sulfonic acid group).

A process for producing a (meth)acrylic copolymer, according to the present invention, comprises the step of carrying out a copolymerization reaction of monomer components in the presence of hypophosphorous acid (salt) and a polymerization initiator to thereby produce the (meth) acrylic copolymer having a phosphorus atom in the main chain, wherein the monomer components include a (meth) acrylic monomer (A) of a general formula (1) below;

with the process being characterized in that the hypophosphorous acid (salt) begins to be supplied into the polymerization system earlier than the polymerization initiator;

wherein the general formula (1) is:

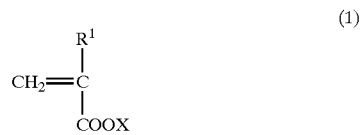

(1)

(wherein: $R^1$ denotes a hydrogen atom or a methyl group; and X denotes a hydrogen atom, a metal atom, an ammonium group, or an organic amine group).

These and other objects and the advantages of the present invention will be more fully apparent from the following detailed disclosure.

DETAILED DESCRIPTION OF THE INVENTION

Figure 1:
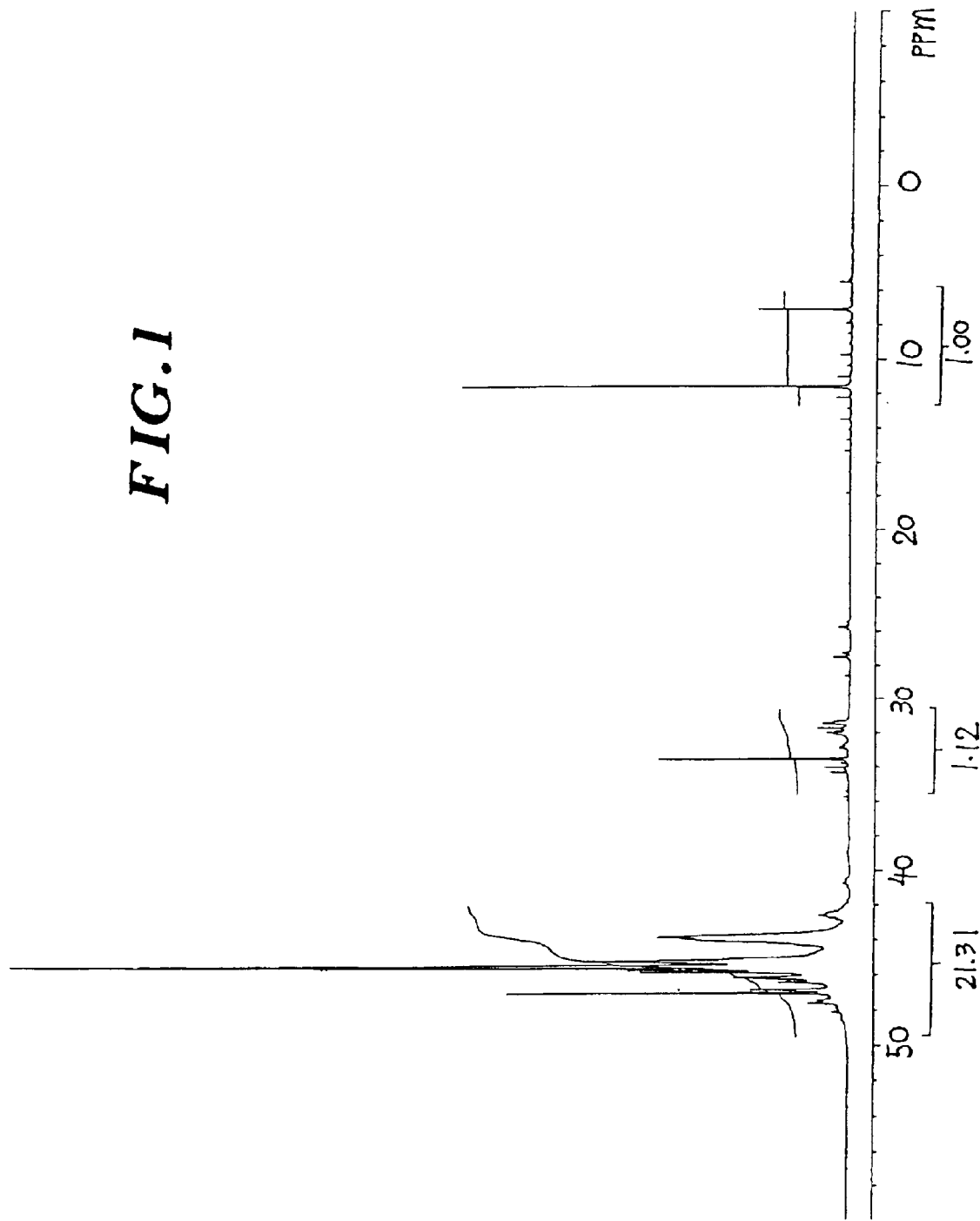
FIG. 1 is a $^{31}$P-NMR chart of the copolymer as obtained in Example 1.

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

[(Meth)acrylic Copolymer]:

The (meth)acrylic copolymer, according to the present invention, is a copolymer which comprises the constitutional unit (a) derivative from the (meth)acrylic monomer (A) of the aforementioned general formula (1) and the constitutional unit (b1) derivative from the (meth)allyl-etheric monomer (B1) of the aforementioned general formula (2), and is a (meth)acrylic copolymer which has the phosphorus atom in the main chain.

The (meth)acrylic monomer (A) is a monomer shown by the aforementioned general formula (1). Specific examples of the metal atom, which is an example of X in the general formula (1), include lithium, sodium, and potassium. Specific examples of the organic amine group include monoethanolamine, diethanolamine, and triethanolamine. Specific examples of the (meth)acrylic monomer (A) include acrylic acid, methacrylic acid, and their salts (e.g. sodium salts, potassium salts, ammonium salts). Of these, particularly, acrylic acid and sodium acrylate are preferable. These may be used either alone respectively or in combinations with each other.

Specific examples of the metal salt of the sulfonic acid group, which is an example of Y and Z in the general formula (2) showing the (meth)allyl-etheric monomer (B1), include salts of such as sodium, potassium, and lithium. Specific examples of the salt of the organic amine group include monoethanolamine, diethanolamine, and triethanolamine. Specific examples of the (meth)allyl-etheric monomer (B1) include: 3-(meth)allyloxy-2-hydroxy-1-propanesulfonic acid and its salts; and 3-(meth)allyloxy-1-hydroxy-2-propanesulfonic acid and its salts. Of these, particularly, sodium 3-allyloxy-2-hydroxy-1-propanesulfonate is preferable. These may be used either alone respectively or in combinations with each other.

In the (meth)acrylic copolymer, according to the present invention, it is important that the mutual ratio between the constitutional unit (a) derivative from the (meth)acrylic monomer (A) and the constitutional unit (b1) derivative from the (meth)allyl-etheric monomer (B1) is in the range of the aforementioned constitutional unit (a) 80 to 96 mol % and the aforementioned constitutional unit (b1) 4 to 20 mol %, favorably the constitutional unit (a) 85 to 96 mol % and the constitutional unit (b1) 4 to 15 mol %, more favorably the constitutional unit (a) 87 to 96 mol % and the constitutional unit (b1) 4 to 13 mol %, still more favorably the constitutional unit (a) 90 to 96 mol % and the constitutional unit (b1) 4 to 10 mol %, particularly favorably the constitutional unit (a) 90 to 95 mol % and the constitutional unit (b1) 5 to 10 mol %. In the case where the ratio of the aforementioned constitutional unit (a) is more than 96 mol % and the ratio of the aforementioned constitutional unit (b1) is less than 4 mol %, then the gelation resistance is so low that, for example, when the copolymer is used as such as a scale inhibitor in the water system containing a large amount of hardness components such as calcium ion, the polymer tends to gel to precipitate, thus becoming unable to display its performances. On the other hand, in the case where the ratio of the aforementioned constitutional unit (a) is less than 80 mol % and the ratio of the aforementioned constitutional unit (b1) is more than 20 mol %, then the chelating ability and dispersibility of the copolymer are so inferior that, for example, the copolymer cannot display its inherent performances as such as dispersants. Particularly, the builder performance represented by the calcium-ion-binding ability is greatly deteriorated.

The (meth)acrylic copolymer, according to the present invention, will do if it has at least the aforementioned constitutional unit (a) and the aforementioned constitutional unit (b1) in the aforementioned ratio. Besides these constitutional units, the copolymer may contain another constitutional unit (b2) derivative from a monomer (B2) other than the aforementioned (meth)allyl-etheric monomer (B1).

For the purpose of sufficiently producing the effects of the present invention, the content of the constitutional unit (b2) is favorably in the range of 0 to 20 mol %, more favorably 0 to 10 mol %, still more favorably 0 to 7 mol %, particularly favorably 0 to 5 mol %, of the entire constitutional units of the copolymer. In other words, for the purpose of sufficiently producing the effects of the present invention, the total content of the constitutional unit (a) and the constitutional unit (b1) in the entire constitutional units of the copolymer is favorably in the range of 80 to 100 mol %, more favorably 90 to 100 mol %, still more favorably 93 to 100 mol %, particularly favorably 95 to 100 mol %.

Examples of the constitutional unit (b2) include: sulfonic monomers (e.g. 2-(meth)acrylamido-2-methylpropanesulfonic acid, (meth)allylsulfonic acid, vinylsulfonic acid, styrenesulfonic acid, 2-sulfoethyl (meth) acrylate, 2-methyl-1,3-butadiene-1-sulfonic acid) and their salts; N-vinyl monomers such as N-vinylpyrrolidone, N-vinylformamide, N-vinylacetamide, N-vinyl-N-methylformamide, N-vinyl-N-methylacetamide, and N-vinyloxazolidone; amidic monomers such as (meth) acrylamide, N,N-dimethylacrylamide, and N-isopropylacrylamide; unsaturated dicarboxylic acids such as itaconic acid, fumaric acid, and maleic acid; allyl-etheric monomers, such as compounds obtained by addition reactions of 1 to 200 mols of ethylene oxide to 3-allyloxy-1,2-dihydroxypropane (e.g. 3-allyloxy-1,2-di((poly)oxyethylene ether)propane), (meth)allyl alcohol, and compounds obtained by addition reactions of 1 to 100 mols of ethylene oxide to (meth)allyl alcohol; (meth)acrylate ester monomers such as methyl (meth)acrylate, ethyl (meth)acrylate, butyl (meth)acrylate, and hydroxyethyl (meth)acrylate; and isoprenic monomers such as isoprenol and compounds obtained by addition reactions of 1 to 100 mols of ethylene oxide to isoprenol. These may be used either alone respectively or in combinations with each other.

It is important that the (meth)acrylic copolymer, according to the present invention, has a weight-average molecular weight in the range of 500 to 4,000, favorably 800 to 3,500, more favorably 1,000 to 3,000. In the case where the weight-average molecular weight is less than 500, there is a possibility that the chelating ability may be inferior. In the case where the weight-average molecular weight is more than 4,000, a possibility that the solubility may be inferior. Therefore, in both cases, the copolymer cannot display performances desired for uses such as water-treating agents, scale inhibitors, additives for excavation, dispersants, and detergent builders.

As to the (meth)acrylic copolymer according to the present invention, it is important that the weight P1 of the phosphorus atoms as bonded to the copolymer and the weight P2 of the phosphorus atoms as not bonded to the copolymer satisfy the relationship of $0.9 \leq P1/(P1+P2) \leq 1.0$. In the case where the P1/(P1+P2) is less than 0.9, the gelation resistance is inferior.

The (meth)acrylic copolymer, according to the present invention, combines the following features: the copolymer has a phosphorus atom in the main chain; there exist the constitutional unit (a) derivative from the (meth)acrylic monomer (A) and the constitutional unit (b1) derivative from the (meth)allyl-etheric monomer (B1) of the specific structure in the above specific ratio; the copolymer is a low-molecular-weight copolymer having a weight-average molecular weight in the range of 500 to 4,000; and the weight P1 of the phosphorus atoms as bonded to the copolymer and the weight P2 of the phosphorus atoms as not bonded to the copolymer satisfy the relationship of $0.9 \leq P1/(P1+P2) \leq 1.0$. Therefore, by synergistic effects between these features (e.g. interactions between the phosphorus atom in the main chain and a functional group (e.g. a hydroxyl group, a sulfonic acid group) possessed by the constitutional unit (b1)), this copolymer can display effects, which have hitherto never been seen, such that this copolymer has the good chelating ability and dispersibility and is excellent both in the calcium-ion-binding ability and the gelation resistance in combination. In addition, this copolymer can further display effects such that the deterioration of these various performances is inhibited even in the water system of high salt concentration.

The (meth)acrylic copolymer, according to the present invention, is characterized by having a gelation resistance of not more than 0.02. The gelation resistance is favorably not more than 0.015, more favorably not more than 0.01, still more favorably not more than 0.008. The gelation resistance is a parameter which shows a property of little gelling. The less the copolymer gels, the smaller the value of the gelation resistance is.

The (meth)acrylic copolymer, according to the present invention, is characterized by having a calcium-ion-binding ability of not less than 150 mgCaCO$_3$/g. The calcium-ion-binding ability is favorably not less than 160 mgCaCO$_3$/g, more favorably not less than 170 mgCaCO$_3$/g. The calcium-ion-binding ability is a parameter which shows a performance as a builder. The higher the builder performance is, the larger the value of the calcium-ion-binding ability is.

[Process for Producing (Meth)Acrylic Copolymer]:

The (meth)acrylic copolymer, according to the present invention, may be produced by any process. However, favorably, the (meth)acrylic copolymer having a phosphorus atom in the main chain is produced by a process comprising the step of carrying out a copolymerization reaction of monomer components in the presence of hypophosphorous acid (salt) and a polymerization initiator, wherein the monomer components include the (meth)acrylic monomer (A) of the aforementioned general formula (1) and the (meth)allyl-etheric monomer (B1) of the aforementioned general formula (2).

The mutual ratio between the aforementioned (meth)acrylic monomer (A) and the aforementioned (meth)allyl-etheric monomer (B1) in the entire monomer components needs to be in the range of the monomer (A) 80 to 96 mol % and the monomer (B1) 4 to 20 mol %, favorably the monomer (A) 85 to 96 mol % and the monomer (B1) 4 to 15 mol %, more favorably the monomer (A) 87 to 96 mol % and the monomer (B1) 4 to 13 mol %, still more favorably the monomer (A) 90 to 96 mol % and the monomer (B1) 4 to 10 mol %, particularly favorably the monomer (A) 90 to 95 mol % and the monomer (B1) 5 to 10 mol %. In the case where the ratio of the aforementioned monomer (A) is more than 96 mol % and the ratio of the aforementioned monomer (B1) is less than 4 mol %, then the gelation resistance is so low that, for example, when the copolymer is used as such as a scale inhibitor in the water system containing a large amount of hardness components such as calcium ion, the polymer tends to gel to precipitate, thus becoming unable to display its performances. On the other hand, in the case where the ratio of the aforementioned monomer (A) is less than 80 mol % and the ratio of the aforementioned monomer (B1) is more than 20 mol %, then the chelating ability and dispersibility of the copolymer are so inferior that, for example, the copolymer cannot display its inherent performances as such as dispersants. Particularly, the builder performance represented by the calcium-ion-binding ability is greatly deteriorated.

The aforementioned monomer components will do if they include at least the aforementioned monomer (A) and the aforementioned monomer (B1) in the aforementioned ratio. Besides these monomers, the monomer components may include a monomer (B2) other than the aforementioned (meth)allyl-etheric monomer (B1).

For the purpose of obtaining the (meth)acrylic copolymer sufficiently exercising the effects of the present invention, the content of the monomer (B2) is favorably in the range of 0 to 20 mol %, more favorably 0 to 10 mol %, still more favorably 0 to 7 mol %, particularly favorably 0 to 5 mol %, of the entire monomer components. In other words, for the purpose of obtaining the (meth)acrylic copolymer sufficiently exercising the effects of the present invention, the total content of the monomer (A) and the monomer (B1) in the entire monomer components is favorably in the range of 80 to 100 mol %, more favorably 90 to 100 mol %, still more favorably 93 to 100 mol %, particularly favorably 95 to 100 mol %.

Specific examples of the monomer (B2) are as aforementioned.

For the purpose of producing the (meth)acrylic copolymer according to the present invention, it is necessary to use the hypophosphorous acid (salt) when carrying out the copolymerization.

The amount of the hypophosphorous acid (salt) as used is favorably in the range of 1 to 20 mol %, more favorably 2 to 15 mol %, still more favorably 5 to 10 mol %, relative to the entire monomer components. In the case where the amount of the aforementioned hypophosphorous acid (salt) as used is smaller than 1 mol % relative to the entire monomer components, the yield of the copolymer having the phosphorus atom in its main chain is low. In the case where the amount of the aforementioned hypophosphorous acid (salt) as used is larger than 20 mol % relative to the entire monomer components, not only does the amount of residual hypophosphorous acid (salt) increase, but also there are economical disadvantages. In addition, in the case where the amount of residual hypophosphorous acid (salt) is large, there is a possibility that the gelation resistance of the resultant copolymer may be inferior.

The amount of residual hypophosphorous acid (salt) is favorably not larger than 1 weight %, more favorably not larger than 0.5 weight %, still more favorably not larger than 0.3 weight %, relative to the entire contents after the polymerization reaction. In addition, the amount of the (meth)acrylic copolymer, relative to the entire contents after the polymerization reaction, is favorably in the range of 10 to 70 weight %, more favorably 20 to 60 weight %, still more favorably 30 to 50 weight %.

Although not especially limited, the method to supply the hypophosphorous acid (salt) into the polymerization system is favorably a method in which the supply is carried out so that the hypophosphorous acid (salt) can coexist with the monomer components in the polymerization system when the copolymerization reaction of the monomer components is carried out, and more favorably a method in which the hypophosphorous acid (salt) begins to be supplied into the polymerization system earlier than the polymerization initiator.

If the hypophosphorous acid (salt) begins to be supplied into the polymerization system earlier than the polymerization initiator, then it is possible to efficiently introduce the phosphorus atom into the main chain of the (meth)acrylic copolymer and further to easily obtain a low-molecular-weight copolymer. In the case where a portion of the hypophosphorous acid (salt) is initially charged, there is s possibility that the hypophosphorous acid (salt) may decompose due to unnecessary heat as applied while the temperature is raised to a desired one. In addition, in the case where the supply of the hypophosphorous acid (salt) into the polymerization system is the same time as or later than that of the initiator, a high-molecular copolymer tends to form.

In the case where the hypophosphorous acid (salt) begins to be supplied into the polymerization system earlier than the polymerization initiator, it is favorable that the hypophosphorous acid (salt), the monomer components, and the polymerization initiator are continuously dropwise added or divisionally added, separately from each other, for their respective predetermined dropwise addition durations. As to the dropwise addition duration, its appropriate setting will do. However, it is favorably in the range of 30 to 480 minutes, more favorably 45 to 300 minutes. In the case where the dropwise addition duration is too long, the productivity tends to be poor. On the other hand, in the case where the dropwise addition duration is too short, it is impossible to effectively carry out the introduction of the phosphorus atom into the main chain of the copolymer. Therefore, both cases are unfavorable. Besides, when the aforementioned components are dropwise added, the dropwise addition speed is not especially limited. For example, it may be a constant speed from beginning to end of the dropwise addition, or, if necessary, it may be varied with the passage of time.

Based on the above knowledge and findings, the process for producing the (meth)acrylic copolymer, according to the present invention, comprises the step of carrying out the copolymerization reaction of the monomer components in the presence of the hypophosphorous acid (salt) and the polymerization initiator to thereby produce the (meth) acrylic copolymer having a phosphorus atom in the main chain, wherein the monomer components include the (meth) acrylic monomer (A) of the aforementioned general formula (1); with the process being characterized in that the hypophosphorous acid (salt) begins to be supplied into the polymerization system earlier than the polymerization initiator. Moreover, it is favorable that, in the monomer components, there is further included the (meth)allyl-etheric monomer (B1) of the aforementioned general formula (2).

When the copolymer is produced, it is possible to use polymerization initiators which are conventionally used. Specific examples of the polymerization initiators include: azo compounds such as 2,2'-azobis(2-amidinopropane) dihydrochloride and 2,2'-azobis[2-methyl-N-(2-hydroxyethyl)propionamide]; peroxides such as hydrogen peroxide and tert-butyl hydroperoxide; and persulfates such as sodium persulfate, potassium persulfate, and ammonium persulfate. These may be used either alone respectively or in combinations with each other. It is favorable that the polymerization initiator is used in an amount of 0.001 to 10 weight % relative to the entire monomer components. In the present invention, it is preferable to use the persulfates such as sodium persulfate, potassium persulfate, and ammonium persulfate in point of the enhancement of the polymerization conversion and the reduction of the amount of residual monomers.

Examples of copolymerization methods, which are usable when the aforementioned monomer components are copolymerized, include publicly known copolymerization methods such as bulk polymerization, solution polymerization, suspension polymerization, and emulsion polymerization. Therefore, there are no especial limitation on the copolymerization methods. Although not especially limited, the reaction temperature in the aforementioned copolymerization is favorably in the range of 50 to 150° C., more favorably 70 to 120° C., most favorably the reflux temperature of a solvent as used. In the case where the reaction temperature is lower than 50° C., there are unfavorable tendencies such that the copolymerization reactivity is so low as to result in the increase of unreacted monomers. On the other hand, in the case where the reaction temperature is higher than 150° C., there are unfavorable tendencies such that so many side reactions occur that the reaction control is difficult. Incidentally, the aforementioned copolymerization reaction may be carried out either under an atmosphere of an inert gas such as nitrogen or argon or under the air.

Although not especially limited, favorable examples of solvents used in the aforementioned copolymerization reaction include those which are selected from among water and alcohols having 1 to 4 carbon atoms such as isopropyl alcohol. These may be used either alone respectively or in combinations with each other. The most favorable is water which is free from any organic solvent.

[Uses]:

Because the (meth)acrylic copolymer according to the present invention has the good chelating ability and dispersibility and is excellent both in the calcium-ion-binding ability and the gelation resistance in combination, and further because the deterioration of these various performances is inhibited even in the water system of high salt concentration, this copolymer can be utilized favorably for uses such as: scale inhibitors (e.g. for cooling water systems, boiler water systems, geothermal-heat water systems, oil field water systems, dust collection water systems, paper production water systems, and mineral refinement water systems); dispersants (e.g. for organic and inorganic pigments and for inorganic materials such as soil and minerals); builders (e.g. for detergents); and fiber-treating agents.

(Effects and Advantages of the Invention):

The present invention can provide a (meth)acrylic copolymer and its production process, wherein the (meth)acrylic copolymer has the good chelating ability and dispersibility and is excellent both in the calcium-ion-binding ability and the gelation resistance in combination, and further, the deterioration of these various performances is inhibited even in the water system of high salt concentration.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them in any way. In addition, the unit "%", as described in the Examples and Comparative Examples, refers to "weight %". The weight-average molecular weight (Mw), $^{31}$P-NMR, gelation resistance, and calcium-ion-binding ability of the polymers, as obtained in the below-mentioned Examples and Comparative Examples, were evaluated by the following methods.

[1] Measurement of Weight-average Molecular Weight (Mw):

The weight-average molecular weight (Mw) was measured by GPC (gel permeation chromatography) under the following conditions.

GPC apparatus: Shodex SYSTEM-21 (detector: RI, UV (220 nm))

Columns: Shodex Asahipak GF-710 HQ
  Shodex Asahipak GF-310 HQ
  (connected in this order)

Eluent: a solution as prepared by a process including the steps of adding pure water to 27.22 g of sodium acetate trihydrate (reagent, special grade) to form an aqueous solution of 2,000 g in entirety and then adding 670 g of acetonitrile (reagent, special grade) to this aqueous solution.

Flow rate: 0.5 mL/min
Temperature: 40° C.
Calibration curve prepared with: poly(acrylic acid) standard sample (product of Sowa Kagaku Co., Ltd.)

[2] Measurement of $^{31}$P-NMR:

NMR apparatus: Varian 400 MHz NMR
Deuterium solvent: heavy water
Temperature: 50° C.
Number of times of integration: not smaller than 25,000

[3] Gelation Resistance:

Deionized water, a boric acid-sodium borate pH buffer, a 1% aqueous copolymer solution, a calcium chloride solution, and a magnesium chloride solution were added in their respective predetermined amounts into a tall beaker of 500 mL in sequence, thereby preparing 500 mL of a test solution of pH=8.5, solid component concentration of copolymer=100 mg/L, calcium hardness=200 mgCaCO$_3$/L, and magnesium hardness=1,000 mgMgCO$_3$/L. This tall beaker was sealed with a poly(vinylidene chloride) film and then left stationary in an isothermal cistern of 90° C. for 1 hour. Thereafter, the turbidity of the test solution, as caused by a gel resultant from bonding between the copolymer and the calcium ion, was detected by measuring the absorbance at a UV wavelength of 380 nm with a quartz cell of 50 mm. The gelation resistance was evaluated by the resultant value of the absorbance. The smaller value indicates the more excellent gelation resistance.

[4] Calcium-ion-binding Ability:

An amount of 50 g of 0.001 mol/L aqueous calcium chloride solution was taken into a beaker of 100 cc in capacity, and then 10 mg (in terms of solid component) of copolymer was added thereto. Next, the pH of the resultant aqueous solution was adjusted into the range of 9 to 11 with dilute sodium hydroxide. Thereafter, under agitation, 1 mL of 4 mol/L aqueous potassium chloride solution was added thereto as a calcium-ion-electrode-stabilizing agent.

The amount of free calcium ion was measured with an ion analyzer (model No. EA920, produced by OLION Co.) and a calcium ion electrode (model No. 93-20, produced by OLION Co.) to determine, by calculation, how many milligrams (in terms of calcium carbonate) of calcium ion had been chelated per 1 g of copolymer (calcium-ion-binding ability, which is a kind of chelating ability). The unit of the calcium-ion-binding ability was "mgCaCO$_3$/g".

EXAMPLE 1

A SUS-made separable flask of 3 L in capacity, as equipped with a stirrer, a reflux condenser, and a thermometer, was beforehand charged with 573 g of pure water and then heated to a boiling point under stirred conditions. Next, under stirred conditions, 35.4 g of 80% aqueous acrylic acid (hereinafter abbreviated to AA) solution, 709 g of 37% aqueous sodium acrylate (hereinafter abbreviated to SA) solution, 275 g of 25% aqueous sodium 3-allyloxy-2-hydroxy-1-propanesulfonate (hereinafter abbreviated to HAPS) solution, 31.2 g of 45% aqueous sodium hypophosphite (hereinafter abbreviated to SHP) solution, and 46.8 g of 15% aqueous sodium persulfate (hereinafter abbreviated to NaPS) solution were, separately from each other, dropwise added into the system being in the boiling point reflux state. Their respective dropwise addition durations were 120 minutes as to the 80% AA, 120 minutes as to the 37% SA, 70 minutes as to the 25% HAPS, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (1).

As a result of the analysis of the resultant aqueous copolymer solution, the weight-average molecular weight of the copolymer (1) was 2,500. This aqueous copolymer solution was dried at 50° C. under reduced pressure to distil off water and then measured by $^{31}$P-NMR using heavy water as the solvent. As a result, a peak of phosphorus, originating from the phosphorus atom as introduced into the main chain of the copolymer, was seen in the range of 30 to 50 ppm. In addition, peaks of phosphorus, originating from the residual sodium hypophosphite and from sodium phosphite as formed from the sodium hypophosphite, were seen near 11 ppm and 7 ppm respectively. From comparison between intensities of these peaks, it was found that, when the weight of phosphorus atoms as bonded to the copolymer was denoted by P1 and when the weight of phosphorus atoms as not bonded to the copolymer was denoted by P2 the value of P1/(P1+P2) was 0.96.

The results of having measured the copolymer (1) by various properties are collected and arranged in order in Table 1.

EXAMPLE 2

The same reactor, as used in Example 1, was beforehand charged with 569 g of pure water and then heated to a boiling point under stirred conditions. Next, under stirred conditions, 42.8 g of 45% aqueous SHP solution began to be dropwise added into the system being in the boiling point reflux state. Subsequently, 5 minutes later, 35.4 g of 80% aqueous AA solution, 709 g of 37% aqueous SA solution, 275 g of 25% aqueous HAPS solution, and 46.8 g of 15% aqueous NaPS solution began to be dropwise added separately from each other at the same time as each other. Their respective dropwise addition durations were 120 minutes as to the 45% SHP, 120 minutes as to the 80% AA, 120 minutes as to the 37% SA, 70 minutes as to the 25% HAPS, and 140 minutes as to the 15% NaPS. After the end of all the dropwise additions, the boiling point reflux state was still kept for 30 minutes to thereby complete the polymerization, thus obtaining an aqueous solution of copolymer (2).

The weight-average molecular weight of the resultant copolymer (2) was 2,200. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.94.

The results of having measured the copolymer (2) by various properties are collected and arranged in order in Table 1.

EXAMPLE 3

The same reactor, as used in Example 1, was beforehand charged with 573 g of pure water and then heated to a boiling point under stirred conditions. Next, under stirred conditions, 35.4 g of 80% aqueous AA solution, 709 g of 37% aqueous SA solution, 117 g of 25% aqueous HAPS solution, 31.2 g of 45% aqueous SHP solution, and 46.8 g of 15% aqueous NaPS solution were, separately from each other, dropwise added into the system being in the boiling point reflux state. Their respective dropwise addition durations were 120 minutes as to the 80% AA, 120 minutes as to the 37% SA, 90 minutes as to the 25% HAPS, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (3).

The weight-average molecular weight of the resultant copolymer (3) was 3,840. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.98.

The results of having measured the copolymer (3) by various properties are collected and arranged in order in Table 1.

EXAMPLE 4

The same reactor, as used in Example 1, was beforehand charged with 573 g of pure water and then heated to a boiling point under stirred conditions. Next, under stirred conditions, 17.7 g of 80% aqueous AA solution, 355 g of 37% aqueous SA solution, 247 g of 25% aqueous HAPS solution, 18.7 g of 45% aqueous SHP solution, and 28.1 g of 15% aqueous NaPS solution were, separately from each other, dropwise added into the system being in the boiling point reflux state. Their respective dropwise addition durations were 120 minutes as to the 80% AA, 120 minutes as to the 37% SA, 90 minutes as to the 25% HAPS, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (4).

The weight-average molecular weight of the resultant copolymer (4) was 2,880. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.96.

The results of having measured the copolymer (4) by various properties are collected and arranged in order in Table 1.

EXAMPLE 5

The same reactor, as used in Example 1, was beforehand charged with 573 g of pure water and then heated to a boiling point under stirred conditions. Next, under stirred conditions, 35.4 g of 80% aqueous AA solution, 709 g of 37% aqueous SA solution, 275 g of 25% aqueous HAPS solution, 28.3 g of 2-hydroxyethyl acrylate (hereinafter abbreviated to HEA), 31.2 g of 45% aqueous SHP solution, and 46.8 g of 15% aqueous NaPS solution were, separately from each other, dropwise added into the system being in the boiling point reflux state. Their respective dropwise addition durations were 120 minutes as to the 80% AA, 120 minutes as to the 37% SA, 90 minutes as to the 25% HAPS, 120 minutes as to the HEA, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (5).

The weight-average molecular weight of the resultant copolymer (5) was 2,780. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.91.

The results of having measured the copolymer (5) by various properties are collected and arranged in order in Table 1.

Comparative Example 1

The same reactor, as used in Example 1, was beforehand charged with 479 g of pure water and then heated to a boiling point under stirred conditions. Next, under stirred conditions, 36.7 g of 45% aqueous SHP solution began to be dropwise added into the system being in the boiling point reflux state. Subsequently, 5 minutes later, 12.1 g of 80% aqueous AA solution, 705 g of 37% aqueous SA solution, 78.8 g of 25% aqueous HAPS solution, and 40.0 g of 15% aqueous NaPS solution began to be dropwise added separately from each other at the same time as each other. Their respective dropwise addition durations were 120 minutes as to the 45% SHP, 120 minutes as to the 80% AA, 120 minutes as to the 37% SA, 110 minutes as to the 25% HAPS, and 140 minutes as to the 15% NaPS. After the end of all the dropwise additions, the boiling point reflux state was still kept for 30 minutes to hereby complete the polymerization, thus obtaining an aqueous solution of copolymer (c1).

The weight-average molecular weight of the resultant copolymer (c1) was 2,800. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.95.

The results of having measured the copolymer (c1) by various properties are collected and arranged in order in Table 1.

Comparative Example 2

The same reactor, as used in Example 1, was beforehand charged with 484 g of pure water and then heated to a boiling point under stirred conditions. Next, under stirred conditions, 36.7 g of 45% aqueous SHP solution began to be dropwise added into the system being in the boiling point reflux state. Subsequently, 5 minutes later, 37.2 g of 80% aqueous AA solution, 489 g of 37% aqueous SA solution, 576 g of 25% aqueous HAPS solution, and 40.0 g of 15% aqueous NaPS solution began to be dropwise added separately from each other at the same time as each other. Their respective dropwise addition durations were 120 minutes as to the 45% SHP, 120 minutes as to the 80% AA, 120 minutes as to the 37% SA, 70 minutes as to the 25% HAPS, and 140 minutes as to the 15% NaPS. After the end of all the dropwise additions, the boiling point reflux state was still kept for 30 minutes to thereby complete the polymerization, thus obtaining an aqueous solution of copolymer (c2).

The weight-average molecular weight of the resultant copolymer (c2) was 3,900. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) as 0.92. collected and arranged in order in Table 1.

Comparative Example 3

The same reactor, as used in Example 1, was beforehand charged with 573 g of pure water and then heated to a boiling point under stirred conditions. Next, under stirred conditions, 35.4 g of 80% aqueous AA solution, 709 g of 37% aqueous SA solution, 275 g of 25% aqueous HAPS solution, 31.1 g of 45% aqueous SHP solution, and 46.8 g of 15% aqueous NaPS solution were, separately from each other, dropwise added into the system being in the boiling point reflux state. Their respective dropwise addition durations were 120 minutes as to the 80% AA, 120 minutes as to the 37% SA, 90 minutes as to the 25% HAPS, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (c3).

The weight-average molecular weight of the resultant copolymer (c3) was 1,090. From $^{31}$P-NMR, it was found that, when the weight of phosphorus atoms as bonded to the copolymer was denoted by P1 and when the weight of phosphorus atoms as not bonded to the copolymer was denoted by P2 the value of P1/(P1+P2) was 0.82.

The results of having measured the copolymer (c3) by various properties are collected and arranged in order in Table 1.

Comparative Example 4

The same reactor, as used in Example 1, was beforehand charged with 573 g of pure water and then heated to a boiling point under stirred conditions. Next, under stirred conditions, 35.4 g of 80% aqueous AA solution, 709 g of 37% aqueous SA solution, 14.8 g of 25% aqueous HAPS solution, 42.8 g of 45% aqueous SHP solution, and 46.8 g of 15% aqueous NaPS solution were, separately from each other, dropwise added into the system being in the boiling point reflux state. Their respective dropwise addition durations were 120 minutes as to the 80% AA, 120 minutes as to the 37% SA, 90 minutes as to the 25% HAPS, 120 minutes as to the 45% SHP, and 140 minutes as to the 15% NaPS. After the end of all the dropwise additions, the boiling point reflux state was still kept for 30 minutes to thereby complete the polymerization, thus obtaining an aqueous solution of copolymer (c4).

The weight-average molecular weight of the resultant copolymer (c4) was 3,800. From $^{31}$P-NRM, it was found that, when the weight of phosphorus atoms as bonded to the copolymer was denoted by P1 and when the weight of phosphorus atoms as not bonded to the copolymer was denoted by P2 the value of P1/(P1+P2) was 0.92.

The results of having measured the copolymer (c4) by various properties are collected and arranged in order in Table 1.

Figure 2:
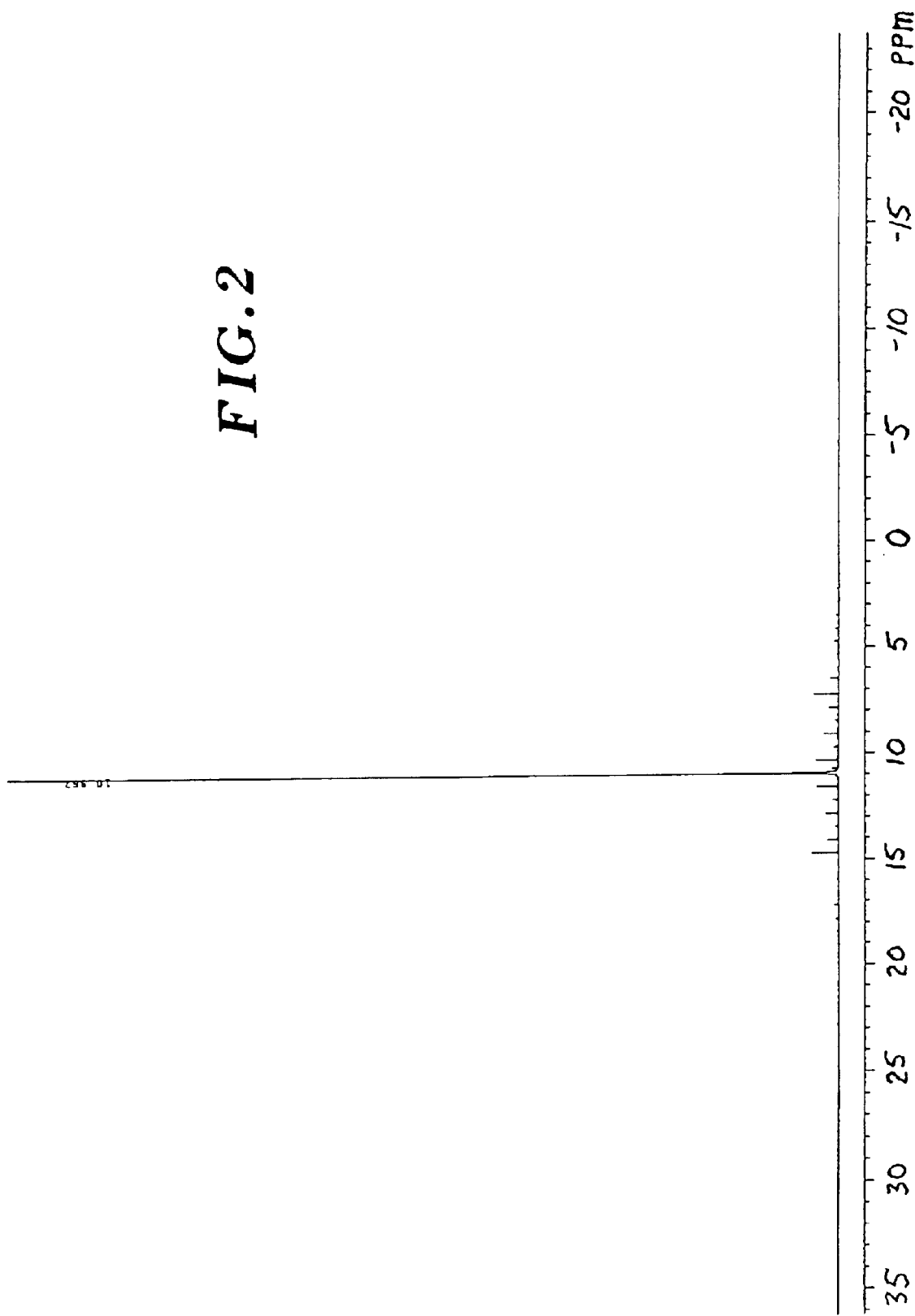
FIG. 2 is a $^{31}$P-NMR chart of sodium hypophosphite.

The behaviors and states of the copolymers, as obtained in Examples 1 to 5 and Comparative Examples 1 to 4, are collected and arranged in order in Table 1. In addition, $^{31}$P-NMR charts of the copolymer, as obtained in Example 1, and of sodium hypophosphite are shown in FIGS. 1 and 2 respectively.

TABLE 1

|  | (Meth)acrylic monomer (A) (mol %) | (Meth)allyl-etheric monomer (B1) (mol %) | Another monomer (B2) (mol %) | Weight-average molecular weight (Mw) | P1/ (P1 + P2) | Gelation resistance | Calcium-ion-binding ability (mgCaCO$_3$/g) |
|---|---|---|---|---|---|---|---|
| Example 1 | 91 | 9 | 0 | 2,500 | 0.96 | 0.004 | 184 |
| Example 2 | 91 | 9 | 0 | 2,200 | 0.94 | 0.006 | 178 |
| Example 3 | 96 | 4 | 0 | 3,840 | 0.98 | 0.011 | 217 |
| Example 4 | 85 | 15 | 0 | 2,880 | 0.96 | 0.003 | 156 |
| Example 5 | 85 | 8.6 | 6.4 | 2,780 | 0.91 | 0.008 | 163 |
| Comparative Example 1 | 97 | 3 | 0 | 2,800 | 0.95 | 0.037 | 201 |
| Comparative Example 2 | 78 | 22 | 0 | 3,900 | 0.92 | 0.001 | 130 |
| Comparative Example 3 | 91 | 9 | 0 | 1,090 | 0.82 | 0.041 | 189 |
| Comparative Example 4 | 99 | 1 | 0 | 3,800 | 0.92 | 0.086 | 221 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A (meth)acrylic copolymer, which comprises a constitutional unit (a) derivative from a (meth)acrylic monomer (A) of a general formula (1) below and a constitutional unit (b1) derivative from a (meth)allyl-etheric monomer (B1) of a general formula (2) below and has a phosphorus atom in the main chain;

with the (meth)acrylic copolymer having:

a mutual ratio between the constitutional unit (a) and the constitutional unit (b1) in the range of the constitutional unit (a) 80 to 96 mol % and the constitutional unit (b1) 4 to 20 mol %; and a weight-average molecular weight in the range of 500 to 4,000; and a weight P1 of phosphorus atoms as bonded to the copolymer and a weight P2 of phosphorus atoms as not bonded to the copolymer satisfy a relationship of $0.9 \leq P1/(P1+P2) \leq 1.0$; and further a gelation resistance of not more than 0.02 and a calcium-ion-binding ability of not less than 150 mgCaCO$_3$/g;

wherein the general formula (1) is:

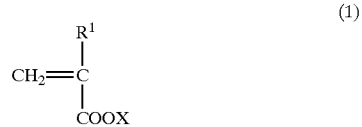

(1)

(wherein: R$^1$ denotes a hydrogen atom or a methyl group; and X denotes a hydrogen atom, a metal atom, an ammonium group, or an organic amine group); and wherein the general formula (2) is:

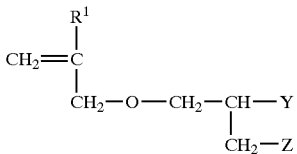

(2)

(wherein: R$^2$ denotes a hydrogen atom or a methyl group; and each of Y and Z independently denotes a hydroxyl group or a sulfonic acid group (wherein the sulfonic acid group may be in the form of a monovalent metal salt, a divalent metal salt, an ammonium salt, or a salt of an organic amine group) wherein at least one of Y and Z is the sulfonic acid group).

2. A (meth)acrylic copolymer according to claim 1, wherein the mutual ratio between the constitutional unit (a) and the constitutional unit (b1) is in the range of the constitutional unit (a) 87 to 96 mol % and the constitutional unit (b1) 4 to 13 mol %.

3. A (meth)acrylic copolymer according to claim 1, wherein the total content of the constitutional unit (a) and the constitutional unit (b1) in the entire constitutional units of the copolymer is in the range of 93 to 100 mol %.

4. A process for producing a (meth)acrylic copolymer, which comprises the step of carrying out a copolymerization reaction of monomer components in the presence of hypophosphorous acid (salt) and a polymerization initiator to thereby produce the (meth)acrylic copolymer having a phosphorus atom in the main chain, wherein the monomer components include a (meth)acrylic monomer (A) of a general formula (1) below;

wherein the hypophosphorous acid (salt) begins to be supplied into the polymerization system earlier than the polymerization initiator;

wherein the general formula (1) is:

(1)

(wherein: R$^1$ denotes a hydrogen atom or a methyl group; and X denotes a hydrogen atom, a metal atom, an ammonium group, or an organic amine group).

* * * * *